:::: {.united-states-patent-office}
United States Patent Office 3,365,973
Patented Jan. 30, 1968
::::

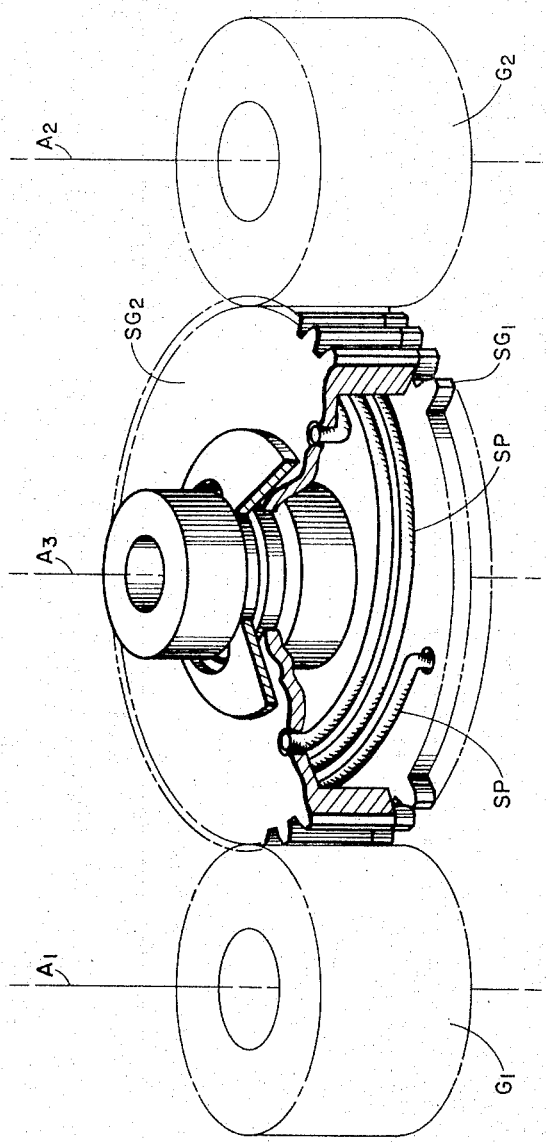

3,365,973
SCISSOR SPUR GEAR DRIVE ARRANGEMENT
Peter J. Henden, Montreal, Quebec, Canada, assignor to Canadian Marconi Company, Montreal, Quebec, Canada
Filed Sept. 22, 1965, Ser. No. 489,282
Claims priority, application Canada, July 6, 1965, 935,162
1 Claim. (Cl. 74—409)

ABSTRACT OF THE DISCLOSURE

A composite gear comprising three shafts, solid spur gears on the outer shafts, and a spring-loaded scissor spur gear on the intermediate shaft, characterized in that the scissor spur gear is spring loaded by torsion spring means.

---

Figure 1:
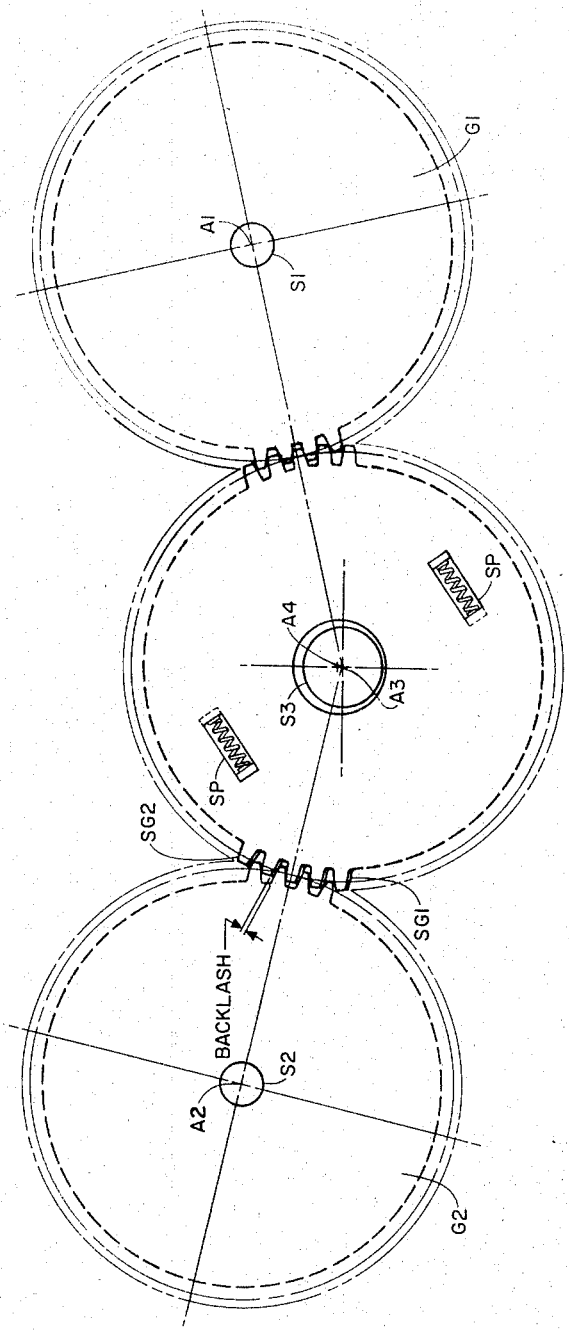

This invention is concerned with antibacklash gear drive arrangements and is aimed at providing a simplified system for removing backlash from a train of spur gears.

A presently known system for eliminating backlash in low power reversible gear trains such as may be used in instrument drives and the like makes use of spring-loaded so-called scissor spur gears. Such a scissor gear may be considered as being a single spur gear transversely sliced in two to form a pair of gears rotating about a common axis. Spring means are interposed between the two gears so arranged as to supply a restoring torque when the two gears are relatively angularly displaced. In use such angular displacement is effected and the scissor gear then engaged with a mating solid spur gear having teeth of width such as to engage both sets of teeth on the scissor gear.

With this known arrangement a separate scissor gear is required for each pair of gears or axles coupled together. Thus if three shafts are involved, and this includes the common case of two shafts driven through an idler gear, two scissor gears are required. If the gear train involves more than three shafts it becomes necessary to mount a pair of axially spaced gears on at least one shaft with the result that extra space in the axial direction must be provided.

It is an aim of the present invention to eliminate the present requirement for duplication of gears in a train of antibacklash gears by providing a new type of spring loaded scissor spur gear capable of meshing with two other spur gears.

According to the invention there is provided in a spur gear train comprising three shafts with solid spur gears on each of the outer shafts, a spring-loaded scissor spur gear on the intermediate shaft characterized in that one scissor gear element thereof is constrained to rotate about the axis of the central shaft and to have predetermined limits of backlash with respect to the mating gears on the two outer shafts and that the other scissor gear element is free to move radially with respect to the axis of said central shaft to shift the center thereof by that amount dependent upon the maximum possible difference in backlash between said one scissor gear element and the two outer gears to ensure simultaneous scissor action between said scissor gear and both of said outer gears.

The invention will be further described with reference to the accompanying drawings in which:

FIGURE 1 is a diagrammatic sketch used to explain the principles of the invention; and FIGURE 2 is a perspective, cut-away view of one embodiment of the invention.

Referring to FIGURE 1, gears G1 and G2, mounted on outer shafts S1 and S2 rotate about axes A1 and A2. An intermediate scissor gear comprised of elements SG1 and SG2 meshes with gears G1 and G2. Scissor gear element SG1 is fixed to the central shaft S3 rotating about axis A3. Spring means, such as SP, SP, apply a torque between scissor gear elements SG1 and SG2. To avoid complicating the drawing gears G1 and SG1 are shown as meshing with zero backlash, but there is backlash as illustrated between gears SG1 and G2. This is equivalent in the present case, as will become evident, of there being a difference in the amount of backlash between the pair G1, SG1 and the pair G2, SG1 of the backlash shown.

In accordance with the invention the scissor gear element SG2 is not constrained to rotate about axis A3 but floats on shaft S3. The assembly of this gear train may be visualized as follows: Assume gear G1 to be fixed. The scissor gear with its respective elements SG1 and SG2 angularly displaced to develop the prescribed torque by spring reaction is meshed with gear G1. Gear G2, which is assumed to be freely rotatable is then meshed with the scissor gear. Spur gear element SG2, not being constrained by shaft S3 now is forced by the spring action to pivot about that one of its teeth in contact with a mating tooth of gear G1 and by reaction on gear G2 forces gear G2 to rotate until its motion is stopped by tooth contact with the mating tooth of spur gear element SG1. Assuming that the torque developed by the spring SP is greater than the torque delivered by the gear train, as is required in any antibacklash system, the scissor gear element SG2 will always maintain the teeth of SG1 in contact with the teeth of the outer gears G1 and G2, and no backlash can develop for either direction of rotation.

It is evident from the above that gear element SG2 in pivoting about the mating tooth of gear G1 shifts its center from the axis A3 to a new axis A4. The amount of this radial movement is very close in the geometry illustrated to one half the backlash. Now, if there were also backlash between gear G1 and scissor gear element SG1, and this was precisely equal to the backlash between scissor gear element SG1 and gear G2, it will be seen that no shift in the axis of scissor gear element SG2 would occur and axes A3 and A4 would coincide. The minimum amount of radial play of scissor gear element SG2 is therefore a function of the total possible difference in backlash as between the scissor gear and the two outer gears and can be readily calculated from a consideration of the manufacturing tolerances on the gears and shaft spacings. From the point of view of the principles of the invention there is no upper limit to the permissible amount of radial play of scissor gear element SG2.

FIGURE 2 shows one embodiment of the invention adapted for use in an instrument gear train. The elements in the arrangement of FIGURE 2 corresponding to those of FIGURE 1 bear the same labelling. In the FIGURE 2 embodiment, the element SG2 is shown as being constructed with a recess adaptable to serve as a housing for the torsion spring SP. The torsion spring will load the scissor gear when there is motion of SG1 relative to SG2. The FIGURE 2 embodiment operates in a manner identical to the FIGURE 1 embodiment. The use of a torsion spring permits the manufacture of gears as small as ¾" diameter.

I claim:

1. In a spur gear train comprising three shafts with solid spur gears on each of the outer shafts, a spring loaded scissor spur gear on the intermediate shaft wherein one scissor gear element thereof is constrained to rotate about the axis of the central shaft and to have predetermined limits of backlash with respect to the mating gears on the two outer shafts and wherein the other scissor gear element is free to move radially with respect to the axis of said central shaft to shift the center thereof by that amount dependent upon the maximum possible difference in backlash between said one scissor gear element and the two outer gears to ensure simultaneous scissor action between said scissor gear and both of said outer gears characterized in that said other scissor gear element contains a central recess in the face of said other scissor gear element, a torsion spring mounted in said recess, said torsion spring being adapted to spring load said scissor spur gear when there is motion of said one gear element relative to said other gear element.

References Cited

UNITED STATES PATENTS

| | | | |
|---|---|---|---|
| 2,607,238 | 8/1952 | English et al. | 74—440 |
| 2,767,652 | 10/1956 | Dietrich et al. | 74—440 X |
| 3,174,356 | 3/1965 | Michalec | 74—440 |

DONLEY J. STOCKING, Primary Examiner.

L. H. GERIN, Assistant Examiner.